United States Patent
Egnell

(10) Patent No.: US 7,327,960 B1
(45) Date of Patent: Feb. 5, 2008

(54) RECEIVER TRANSPONDER FOR PROTECTED NETWORKS

(75) Inventor: Lars Egnell, Saltsjobaden (SE)

(73) Assignee: Cisco Systems (Sweden) AB (SE)

( * ) Notice: Subject to any disclaimer, the term of this patent is extended or adjusted under 35 U.S.C. 154(b) by 0 days.

(21) Appl. No.: 09/936,961

(22) PCT Filed: Mar. 20, 2000

(86) PCT No.: PCT/SE00/00544

§ 371 (c)(1),
(2), (4) Date: Jan. 29, 2002

(87) PCT Pub. No.: WO00/55995

PCT Pub. Date: Sep. 21, 2000

(30) Foreign Application Priority Data

Mar. 18, 1999 (SE) ..................... 9900991

(51) Int. Cl.
*H04B 10/00* (2006.01)
(52) U.S. Cl. .......................... 398/175; 398/83; 398/181
(58) Field of Classification Search .................. 398/3, 398/4, 12, 59, 19, 45, 181, 111, 175, 30, 33, 398/37, 83; 370/16; 375/355, 358, 362
See application file for complete search history.

(56) References Cited

U.S. PATENT DOCUMENTS 4,227,260 A * 10/1980 Vojvodich et al. ............ 398/61
4,829,512 A * 5/1989 Nakai et al. ................. 370/224

(Continued)

FOREIGN PATENT DOCUMENTS

| EP | 0 668 674 A2 | 8/1995 |
| EP | 0 689 309 A2 | 12/1995 |
| WO | WO 98/52314 | 11/1998 |

OTHER PUBLICATIONS

Marsan, M. Ajmone et al., "Daisy: a scalable all-optical packet network with multifiber ring topology," *Computer Networks and ISDN Systems*, vol. 30, pp. 1065-1082.

*Primary Examiner*—Agustin Bello
(74) *Attorney, Agent, or Firm*—Aka Chan LLP

(57) ABSTRACT

A receiver transponder to be used in an optical add and drop multiplexer connected in short haul type networks receives light signals from two opposite directions on input fibers (21, 23). The optical input signals are converted to electrical signals by O/E converters (51, 53). The output terminals of the converters are connected to an electronic switch (61) which handles protection switching in a protected ring type network. The output of the switch can be monitored (65) before, it enters a reshaping circuit (67) in which the signal is reshaped, cleansed from a supervisory channel and given a proper drive level for a following laser (69). The optical signal from the laser can travel a significant distance through a fiber (71) to a client receiver or sustain other forms of attenuation and still have a sufficient signal power for reliable detection. An electrical output signal can be provided (73) by the reshaping circuit. The converters can be used to protect for one another and to detect channel signal power and a supervisory channel at electric outputs (57, 59). The laser can be a low cost type since the laser is typically used for transmitting light over only moderate distances and the input signal is amplified and reshaped. The electric high frequency switch is generally more reliable and can be more easily monitored than a purely optical switch.

8 Claims, 3 Drawing Sheets

U.S. PATENT DOCUMENTS

| | | | |
|---|---|---|---|
| 5,130,837 A * | 7/1992 | Kitamura et al. | 398/37 |
| 5,229,875 A | 7/1993 | Glista | |
| 5,434,691 A * | 7/1995 | Yamane | 398/5 |
| 6,134,036 A | 10/2000 | Andreozzi et al. | |
| 6,137,603 A * | 10/2000 | Henmi | 398/4 |
| 6,333,804 B1 * | 12/2001 | Nishiyama et al. | 398/202 |
| 6,639,703 B1 | 10/2003 | Egnell | |
| 6,748,174 B2 * | 6/2004 | Milton et al. | 398/79 |

* cited by examiner

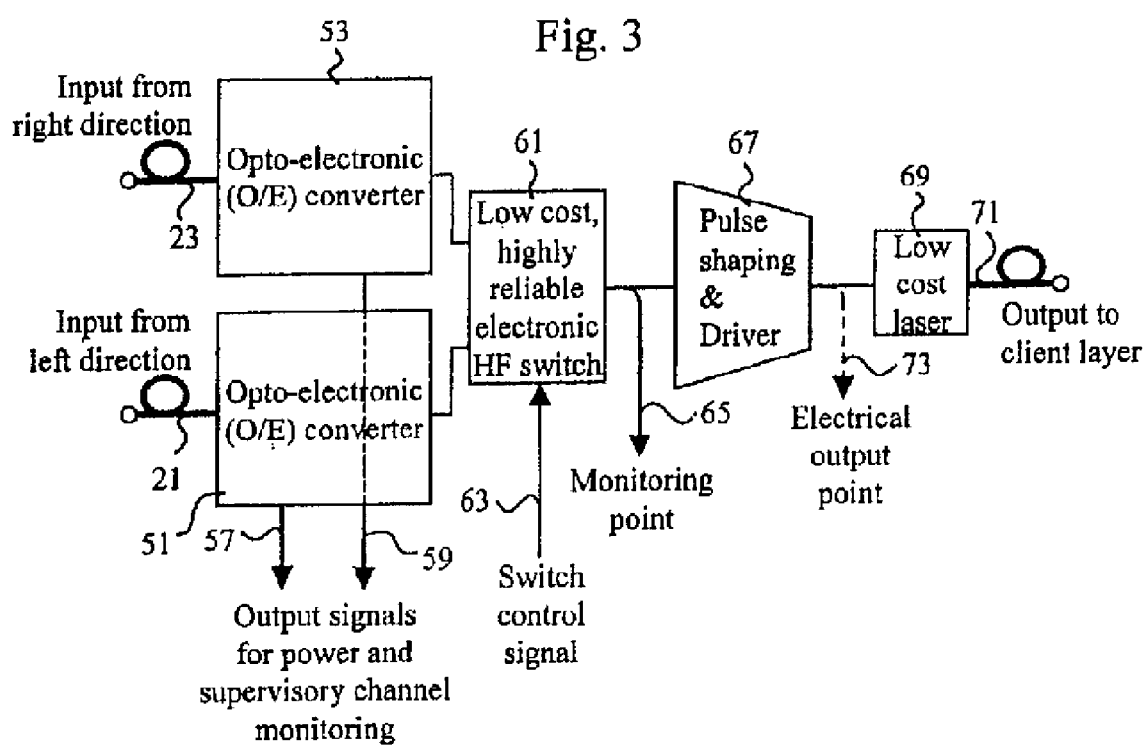

RECEIVER TRANSPONDER FOR PROTECTED NETWORKS

CROSS-RELATED APPLICATIONS

The present application is a national stage application of PCT Patent Application No. PCT/SE00/00544, filed Mar. 20, 2000 which claims priority from Swedish Patent Application No. 9900991-2, filed Mar. 18, 1999, entitled "A RECEIVER TRANSPONDER FOR PROTECTED NETWORKS". The present application is also related to U.S. patent application Ser. No. 09/637,027, filed Aug. 14, 2000, now issued as U.S. Pat. No. 6,639,703, and to co-pending U.S. patent application Ser. No. 10/462,087, filed Jun. 12, 2003; all of which are incorporated herein by reference in their entirety.

TECHNICAL FIELD

The present invention relates to a receiver transponder used in an optical add and drop node and capable of handling optical switching for protecting paths in a network, in which the add and drop node is intended to be used, and also to a protected network in which such an optical add and drop node is used.

BACKGROUND

Network availability is of significant importance in tele- and datacommunication networks evolving nowadays. One way of improving the availability of such networks comprises building protection features into the networks such that efficient means are provided to switch traffic to a different path in the case of a failure somewhere in a path used. With the rapid development of DWDM (Dense Wavelength Division Multiplexing) and of general and special techniques of building optical networks using e.g. different forms of WDM (Wavelength Division Multiplexing), there is a growing interest in means to handle protection in optical transmission systems and optical networks.

In FIGS. 1a-1c schematics of optical networks are shown which have various levels of ring protection in the optical layer. Thus, the illustrated networks all have a ring structure and contain Optical Add and Drop (Add/Drop) Multiplexer (OADM) blocks 1, also called optical add and drop nodes or add/drop nodes, which contain the filters and couplers necessary to add, drop and block wavelengths which are terminated in the node. Each such OADM block 1 is connected to a left OADM block and to a right OADM block through pairs 3 of optical fibers, one pair outgoing from the considered node in a left hand or western direction and a second pair outgoing in a right hand or eastern direction. In the scheme of FIG. 1a each OADM block 1 is connected to a transmitter-responder or transponder (TP) 5 and to a receiver (R) 7 through an optical switch 9. The transponder 5 transmits the wavelength signal in both directions and a block receiving the wavelength signal can choose the direction from which to receive that wavelength channel using its receiver 7 by setting its switch 9 accordingly. The receiver 7 receives light signals and converts them to for example electrical signals. In the network as illustrated in FIG. 1a there are two possible different paths of transmitting information from one node to another way, a first path extending in a clockwise direction and a second path extending in counter-clockwise direction. Both paths can be used simultaneously, the first path for some channels and the second for other channels. However, normally only one of the two possible paths will be used for all communication from one node to another node. When a fault occurs in such path, the other path can be used, this feature providing the protection of the network. Such a protected network can handle single faults in an optical fiber, in the cable holding the pair of fibers and connecting the OADM blocks or in the OADM blocks. In a special kind of control of such networks there is always one inactive link between two adjacent blocks whereas all the other links are used for transmission. The position of the inactive link can then be displaced when a fault occurs.

The optical network as illustrated by the scheme of FIG. 1b gives the same level of protection as that of FIG. 1a but may allow a more efficient use of transmitter power and a reuse of wavelengths in the ring architecture. Here also the transponders 7 are connected to the OADM block 1 through optical switches 11, allowing the direction to be chosen, in which the respective transponder will transmit. There may, however, also be concerns about the reliability of the transmitter optical switches 11 and the possibility to monitor the health of the protection path. In the optical network of FIG. 1c separate transponders 5', 5" are provided for transmitting in each direction, this layout not requiring any transmitter optical switches. In this third network scheme also faults in a transmitter or in a transponder can be mitigated.

It is a feature common to all the schemes as discussed above that a switching function on the receiving end is required in order to choose the direction from which the wavelength is to be received (the switch 9). A natural conclusion is then to let a simple optical space switch handle this function which may be an efficient solution in the type of WDM systems which have up to now been introduced on the market. These systems are, however, primarily intended for long distance applications and the system architectures are typically based on optical amplifiers as fundamental building blocks and a separate wavelength channel is typically used for supervisory signalling. In metropolitan and wide area networks, which are more short haul type applications by their nature, other more cost efficient system and technology solutions have to be found, while the important system functions still have to be retained. These solutions would then preferably not be based on optical amplifiers what implies that it will be imperative to minimize the attenuation between all ports in the node. Furthermore, it becomes important to take into account all the network functions that need to be implemented in connection with the "optical switch" used (e.g. the switch 9 in FIGS. 1a-1c). One such natural way to implement the receiving end is illustrated by the schematic block diagram of a node or OADM block of FIG. 2, only showing the devices necessary for receiving in the node.

The wavelength channels from other OADM blocks, arriving to the considered node from the left and the right directions respectively, arrive at a left input fiber 21 and a right input fiber 23 as illustrated in FIG. 2. From these signals a portion of the optical power is extracted using optical tapping couplers 25, 27 connected to the respective input fiber. The extracted signals are fed to optical-to-electrical converters 29, 31 converting the instant optical power to electric power representing the optical signal. The average power or the power levels of the two wavelength channels can then be measured as indicated by the outputs 33, 35. Also, an overlaid embedded supervisory data channel can be detected in the electric signals by feeding the detected instant power signal to a supervisory channel receiver or supervisory channel receivers 37. The detected power levels at the outputs 33, 35 are used to monitor the health of the paths from the left and the right direction respectively and to make decisions about when and how to protect the node changing the position of an optical switch 39. This optical switch corresponds to the switch 9 of FIGS. 1*a*-1*c*.

Since a separate supervisory wavelength channel would be significantly more costly, both in terms of component cost and additional attenuation in the node, such an embedded channel solution is to be preferred. The other output ports of the tapping couplers 25, 27 are connected to the optical switch 39. The position of the switch 39 determines the direction from which the wavelength channel is to be received. The output of this switch 39 is fed into another optical tapping coupler 41 which has one output connected to another optical-to-electrical converter 43 providing an electric signal at an output 45, from which the average power of power level at the output of the optical switch 39 can be detected and monitored. By comparing the power levels as represented by the electric signals on the outputs 33, 35, 45 of the power detectors 29, 31, 43 the health of and the attenuation in the switch 39 can be deduced. Another output 46 from the tapping coupler 41 is intended to be connected to the client receiver (the receiver 7 in FIGS. 1*a*-1*c*).

The implementation in FIG. 2 may be natural as well as economically and technically feasible. There are however a number of important issues which need to be considered using this type of implementation based on an optical switch:

The reliability of the switch. This switch is a single point of failure in the link and hence the reliability of the switching component is very important. Unfortunately it is difficult to test the long term reliability of many of the optical switches available on the market.

An associated issue is that it does not appear to be easy to reliably health monitor an optical switch. How do you know that it will actually switch in a proper way when required?

The penalty in terms of signal attenuation associated with the optical couplers and the optical switch.

The cost of the optical switch and the cost of additional optical couplers and detectors required for extracting monitoring and supervisory information.

How and where to extract a supervisory channel and how to block this channel from passing to the client layer, possibly disturbing the detection of the client signal.

Finally there are other issues which may indirectly have an impact on the choice of implementation such as for instance that the receivers in the client equipment may be unsuitable for directly receiving a wavelength channel from an optical DWDM network. This may be due to poor receiver sensitivity, dynamic range problems or that the receiver incorporates a detector which cannot handle the used wavelength.

In the published European patent application No. 0 689 309 an add/drop node of a two-fiber ring network using a time division transmission method is disclosed. In selecting a light signal from one of the parallel paths a switch or a receiving control section can be used. The receiving control section appears to make "physical grouping and distribution of signal lines" and it is said to have the function of "allocating a differing number of channels to the clockwise and counterclockwise directions" and it "controls what signal from either the clockwise or counterclockwise transmission path is to received". Thus, no details are disclosed on the internal structure of the receiving control section. In the published European patent application No. 0 668 674 a fiber network having add/drop nodes is disclosed.

SUMMARY

It is an object of the invention to provide an optical add and drop node comprising a receiver transponder which has switching capabilities with a high reliability and which can be easily monitored.

A receiver transponder as outlined hereinafter deals with all the above issues in a is very efficient manner. The wavelength channels, which are to be dropped in the node from the left and the right fiber directions, are converted by their respective optical-to-electrical (O/E) converters. These converters can be designed to have a suitable sensitivity and a suitable dynamic range for the actual application. The converters can also be used to protect for one another and they constitute a natural place to detect channel signal power and a supervisory channel at a close to zero cost.

The output terminals of the O/E converters are connected to an electronic high frequency (HF) switch which handles the protection switching and which can be implemented at a low cost and using very reliable components such as a FET attenuator in each arm. The output from the switch can be monitored for further definition of the health of the presently received signal before it enters a block in which the signal is reshaped, cleansed from the supervisory channel and given the proper drive levels for the following laser. This laser can be a low cost type since the signal is now amplified and reshaped and hence is relatively insensitive to the conditions between the laser and the client equipment. The signal from the laser can thus travel a significant distance through an optical fiber to the client receiver or sustain other forms of attenuation and still have a signal power which is sufficient for reliable detection. If an electrical output signal would be desirable, it can of course also be accommodated from the output of the reshaping driver circuit as in FIG. 2. This may also be a suitable point to extract a signal for monitoring the performance of client channels.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 3 is diagram of a network using an electric switch in an optical add and drop node in a network as illustrated in any of FIGS. 1a-1c.

DETAILED DESCRIPTION

Figure 1A:
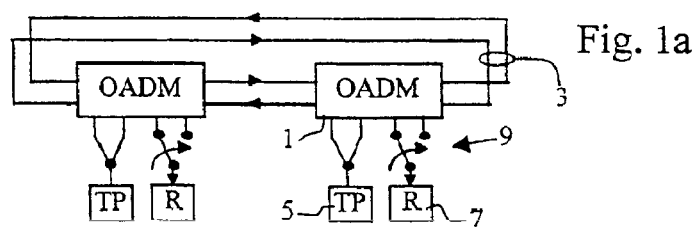
FIG. 1*a* is a diagram of a network which can handle a single fault in an optical fiber, in the cable holding a pair of fibers and connecting the OADM blocks or in an OADM block.
Figure 1B:
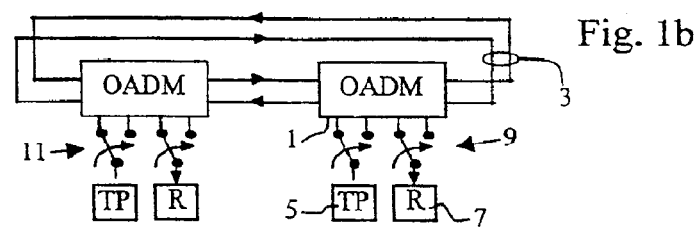
FIG. 1*b* is a diagram of a network similar to that of FIG. 1*a* which gives the same level of protection and allows a more efficient use of transmitter power and a reuse of wavelengths in the network.
Figure 1C:
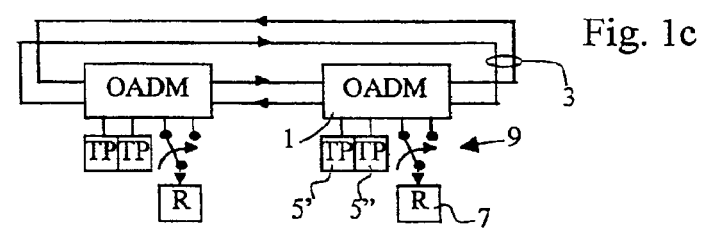
FIG. 1*c* is a diagram of a network similar to that of FIG. 1*a* which gives a better level of protection and which can handle a single fault in a transmitter or in a transponder.
Figure 2:
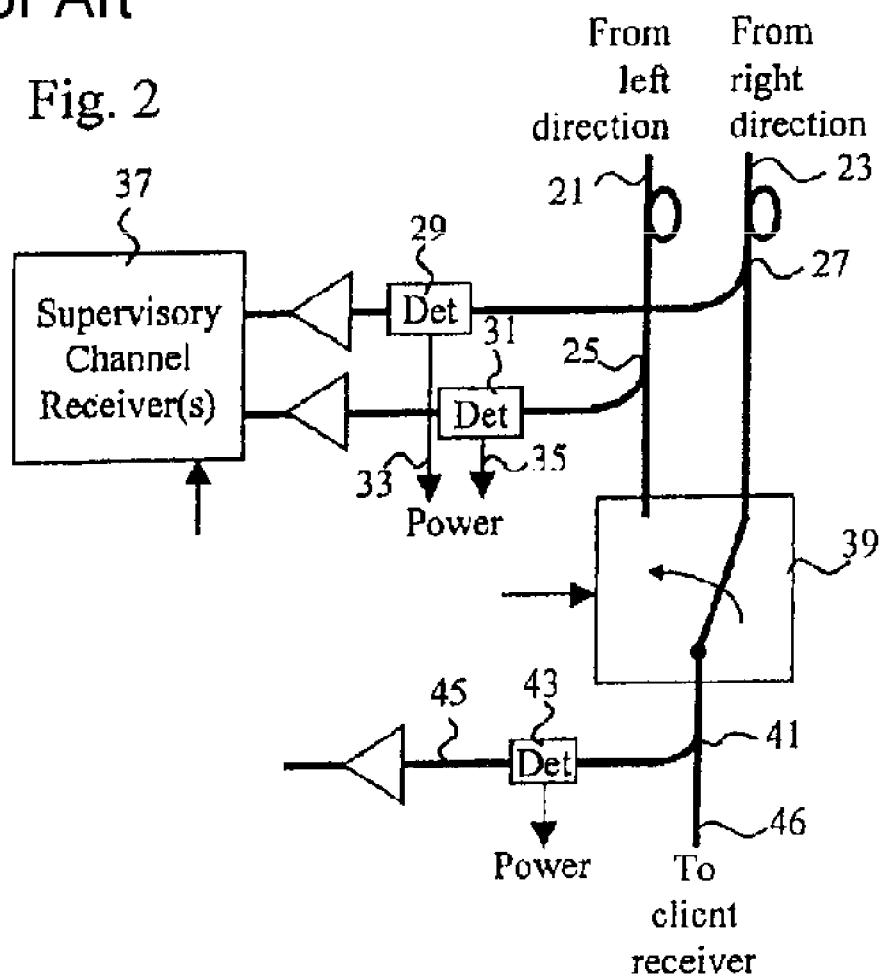
FIG. 2 is a block diagram of the receiving side using an optical switch in an optical add and drop node in a network as illustrated in any of FIGS. 1a-1c.

In FIG. 3 the receiving part of an optical add and drop node is shown. The optical signals enter the node at an input left fiber 21 and an input right fiber 23. The left input fiber is connected to a left optical-to-electrical or opto-electronic (O/E) converter 51 and the right input fiber is connected to a right opto-electronic (O/E) converter 53. In the converters 51, 53 the incoming light signals are converted to electrical signals such as by sensing the instantaneous light power of the incoming signals and representing the sensed power by an electric signal. The O/E converters can be designed to have a suitable sensitivity and dynamic range in order to correctly convert the light signals to be received. Each O/E converter 51, 53 has output terminals 57, 59 providing the electric signals which represent the detected instantaneous channel signal power, from which the average power and a signal carrying a supervisory channel can be detected by monitoring circuits, not shown.

The main output terminals of the O/E converters 51, 53 are connected to an electronic high frequency (HF) switch 61 controlled by a control signal input on a control input terminal 63. The HF switch 61 handles the protection switching and it can be built at a low cost using very reliable components such as FETs (Field Effect Transistors). A portion of the output signal of the switch 61 is provided to monitoring circuits as represented by the electric line 65, which circuit are used for defining the health of the presently received signal. The other portion of the electric output signal is provided to a reshaping circuit block 67 in which the signal is reshaped, is cleansed from a supervisory channel and is given a proper power level for the following laser 69. The reshaped signal is provided to the laser 69 which can be a low cost type for typical applications. The optical signal output from the laser 69 can travel a significant distance through a fiber 71 to a client receiver or sustain other forms of attenuation and still have a sufficient signal power for reliable detection. If an electrical output signal would be desirable, it can of course be provided from the output of the reshaping circuit 67 as represented by the electric line 73. From such an electrical output signal a signal can be extracted for performance monitoring of client channels.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A receiver transponder to be used in an optical add and drop node connected in a two-fiber network, comprising:

first and second optoelectric converters for converting received optical signals to electric signals and each having an optical input terminal and an output terminal, the first optoelectric converter having its optical input terminal connected to an optical fiber carrying light signals from a first direction for receiving the light signals and for converting them to electric signals on a first output terminal and the second optoelectric converter having its optical input terminal connected to an optical fiber carrying light signals from a second direction opposite the first direction for receiving the light signals and for converting them to electric signals on a second output terminal, each optoelectric converter generating an output signal carrying light signal power information and a supervisory channel on a monitor output terminal different from the output terminal of the optoelectric converter;

an electronic switch having two signal input terminals, a signal output terminal and a control input terminal, each of the two optoelectric converters connected with the first and second output terminals respectively to one of the two signal input terminals of the electronic switch, a signal on the control input terminal controlling the electronic switch to select one of the signal input terminals from which a signal existing on the selected one of the signal input terminals is transferred to the signal output terminal of the electronic switch, whereby the direction from which information on a channel terminated in the optical add and drop node is to be received can be chosen;

an electronic reshaping circuit having an input terminal and an output terminal the input terminal connected to the signal output terminal of the electronic switch for reshaping a signal output from the electronic switch; wherein the electronic reshaping circuit is also arranged to clean the supervisory channel from the signal output from the electronic switch.

2. A receiver transponder to be used in an optical add and drop node connected in a two-fiber network, comprising:

first and second optoelectric converters for converting received optical signals to electric signals and each having an optical input terminal and an output terminal, the first optoelectric converter having its optical input terminal connected to an optical fiber carrying light signals from a first direction for receiving the light signals and for converting them to electric signals on a first output terminal and the second optoelectric converter having its optical input terminal connected to an optical fiber carrying light signals from a second direction opposite the first direction for receiving the light signals and for converting them to electric signals on a second output terminal, each optoelectric converter generating an output signal carrying light signal power information and a supervisory channel on a monitor output terminal different from the output terminal of the optoelectric converter;

an electronic switch having two signal input terminals, a signal output terminal and a control input terminal, each of the two optoelectric converters connected with the first and second output terminals respectively to one of the two signal input terminals of the electronic switch, a signal on the control input terminal controlling the electronic switch to select one of the signal input terminals from which a signal existing on the selected one of the signal input terminals is transferred to the signal output terminal of the electronic switch, whereby the direction from which information on a channel terminated in the optical add and drop node is to be received can be chosen; and an electronic reshaping circuit having an input terminal and an output terminal, the input terminal connected to the signal output terminal of the electronic switch for reshaping a signal output from the electronic switch, wherein the electronic reshaping circuit is also arranged to give a signal output from the electronic reshaping circuit on its output terminal a predetermined electric power.

3. A receiver transponder to be used in an optical add and drop node connected in a two-fiber network, comprising:

first and second optoelectric converters for converting received optical signals to electric signals and each having an optical input terminal and an output terminal, the first optoelectric converter having its optical input terminal connected to an optical fiber carrying light signals from a first direction for receiving the light signals and for converting them to electric signals on a first output terminal and the second optoelectric converter having its optical input terminal connected to an optical fiber carrying light signals from a second direction opposite the first direction for receiving the light signals and for converting them to electric signals on a second output terminal, each optoelectric converter generating an output signal carrying light signal power information and a supervisory channel on a monitor output terminal different from the output terminal of the optoelectric converter;

an electronic switch having two signal input terminals, a signal output terminal and a control input terminal, each of the two optoelectric converters connected with the first and second output terminals respectively to one of the two signal input terminals of the electronic switch, a signal on the control input terminal controlling the electronic switch to select one of the signal input terminals from which a signal existing on the selected one of the signal input terminals is transferred to the signal output terminal of the electronic switch whereby the direction from which information on a channel terminated in the optical add and drop node is to be received can be chosen;

an electronic reshaping circuit having an input terminal and an output terminal the input terminal connected to the signal output terminal of the electronic switch for reshaping a signal output from the electronic switch; and a laser having an input terminal, the output terminal of the electronic reshaping circuit connected to the input terminal of the laser, the laser producing a light signal provided to a client layer.

4. A receiver transponder to be used in an optical add and drop node connected in a two-fiber network comprising:

first and second optoelectric converters for converting received optical signals to electric signals and each having an optical input terminal and an output terminal the first optoelectric converter having its optical input terminal connected to an optical fiber carrying light signals from a first direction for receiving the light signals and for converting them to electric signals on a first output terminal and the second optoelectric converter having its optical input terminal connected to an optical fiber carrying light signals from a second direction opposite the first direction for receiving the light signals and for converting them to electric signals on a second output terminal, each optoelectric converter generating an output signal carrying light signal power information and a supervisory channel on a monitor output terminal different from the output terminal of the optoelectric converter;

an electronic switch having two signal input terminals, a signal output terminal and a control input terminal, each of the two optoelectric converters connected with the first and second output terminals respectively to one of the two signal input terminals of the electronic switch, a signal on the control input terminal controlling the electronic switch to select one of the signal input terminals from which a signal existing on the selected one of the signal input terminals is transferred to the signal output terminal of the electronic switch, whereby the direction from which information on a channel terminated in the optical add and drop node is to be received can be chosen; and an electronic reshaping circuit having an input terminal and an output terminal, the input terminal connected to the signal output terminal of the electronic switch for reshaping a signal output from the electronic switch, wherein the output terminal of the electronic reshaping circuit is connected to an input terminal of a client layer.

5. A protected two-fiber network comprising:

optical add and drop nodes connected by links to form a ring, first optical fibers connected to form a first ring and transmitting light signals in a first direction and second optical fibers connected to form a second ring parallel to the first ring and transmitting light signals in a second direction opposite the first direction, each optical add and drop node comprising a receiver transponder and a switch for choosing a direction from which information on a channel terminated in the considered optical add and drop node is to be received in the node, characterized in that at least one of the receiver transponders comprises two optoelectric converters for converting received optical signals to electric signals, a first one of the two optoelectric converters having an optical input terminal, an output terminal and a monitor output terminal, the optical input terminal connected to one of the first optical fibers carrying light signals in the first direction, a second one of the two optoelectric converters having an optical input terminal, an output terminal and a monitor output terminal, the optical input terminal connected to one of the second optical fibers carrying light signals in the second direction, and that the switch is an electronic switch and has two signal input terminals, a signal output terminal and a control input terminal, the two optoelectric converters each generating an output signal carrying light signal power information and a supervisory channel on their monitor output terminals and having their output terminals carrying the electric signals converted from the received optical signals connected to the two signal input terminals of the electronic switch, a signal on the control input terminal controlling the electronic switch to select one of the signal input terminals from which a signal existing thereon is transferred to the signal output terminal of the electronic switch; and an electronic reshaping circuit having an input terminal and an output terminal, the input terminal connected to the output terminal of the electronic switch for receiving and reshaping a signal output from the electronic switch, wherein the reshaping circuit is also arranged to clean the supervisory channel from the signal output from the electronic switch.

6. A protected two-fiber network comprising:

optical add and drop nodes connected by links to form a ring, first optical fibers connected to form a first ring and transmitting light signals in a first direction and second optical fibers connected to form a second ring parallel to the first ring and transmitting light signals in a second direction opposite the first direction, each optical add and drop node comprising a receiver transponder and a switch for choosing a direction from which information on a channel terminated in the considered optical add and drop node is to be received in the node, characterized in that at least one of the receiver transponders comprises two optoelectric converters for converting received optical signals to electric signals, a first one of the two optoelectric converters having an optical input terminal, an output terminal and a monitor output terminal, the optical input terminal connected to one of the first optical fibers carrying light signals in the first direction, a second one of the two optoelectric converters having an optical input terminal, an output terminal and a monitor output terminal, the optical input terminal connected to one of the second optical fibers carrying light signals in the second direction, and that the switch is an electronic switch and has two signal input terminals, a signal output terminal and a control input terminal, the two optoelectric converters each generating an output signal carrying light signal power information and a supervisory channel on their monitor output terminals and having their output terminals carrying the electric signals converted from the received optical signals connected to the two signal input terminals of the electronic switch, a signal on the control input terminal controlling the electronic switch to select one of the signal input terminals from which a signal existing thereon is transferred to the signal output terminal of the electronic switch; and an electronic reshaping circuit having an input terminal and an output terminal, the input terminal connected to the output terminal of the electronic switch for receiving and reshaping a signal output from the electronic switch, wherein the reshaping circuit is also arranged to provide a reshaped signal output on its output terminal having a predetermined power.

7. A protected two-fiber network comprising:

optical add and drop nodes connected by links to form a ring, first optical fibers connected to form a first ring and transmitting light signals in a first direction and second optical fibers connected to form a second ring parallel to the first ring and transmitting light signals in a second direction opposite the first direction, each optical add and drop node comprising a receiver transponder and a switch for choosing a direction from which information on a channel terminated in the considered optical add and drop node is to be received in the node, characterized in that at least one of the receiver transponders comprises two optoelectric converters for converting received optical signals to electric signals, a first one of the two optoelectric converters having an optical input terminal, an output terminal and a monitor output terminal, the optical input terminal connected to one of the first optical fibers carrying light signals in the first direction, a second one of the two optoelectric converters having an optical input terminal, an output terminal and a monitor output terminal, the optical input terminal connected to one of the second optical fibers carrying light signals in the second direction, and that the switch is an electronic switch and has two signal input terminals, a signal output terminal and a control input terminal, the two optoelectric converters each generating an output signal carrying light signal power information and a supervisory channel on their monitor output terminals and having their output terminals carrying the electric signals converted from the received optical signals connected to the two signal input terminals of the electronic switch, a signal on the control input terminal controlling the electronic switch to select one of the signal input terminals from which a signal existing thereon is transferred to the signal output terminal of the electronic switch;

an electronic reshaping circuit having an input terminal and an output terminal, the input terminal connected to the output terminal of the electronic switch for receiving and reshaping a signal output from the electronic switch; and a laser having an input terminal and an optical output terminal, the output terminal of the electronic reshaping circuit connected to the input terminal of the laser and the laser producing on its optical output terminal a light signal provided to a client layer.

8. A protected two-fiber network comprising:

optical add and drop nodes connected by links to form a ring, first optical fibers connected to form a first ring and transmitting light signals in a first direction and second optical fibers connected to form a second ring parallel to the first ring and transmitting light signals in a second direction opposite the first direction, each optical add and drop node comprising a receiver transponder and a switch for choosing a direction from which information on a channel terminated in the considered optical add and drop node is to be received in the node, characterized in that at least one of the receiver transponders comprises two optoelectric converters for converting received optical signals to electric signals, a first one of the two optoelectric converters having an optical input terminal, an output terminal and a monitor output terminal, the optical input terminal connected to one of the first optical fibers carrying light signals in the first direction, a second one of the two optoelectric converters having an optical input terminal, an output terminal and a monitor output terminal, the optical input terminal connected to one of the second optical fibers carrying light signals in the second direction, and that the switch is an electronic switch and has two signal input terminals, a signal output terminal and a control input terminal, the two optoelectric converters each generating an output signal carrying light signal power information and a supervisory channel on their monitor output terminals and having their output terminals carrying the electric signals converted from the received optical signals connected to the two signal input terminals of the electronic switch, a signal on the control input terminal controlling the electronic switch to select one of the signal input terminals from which a signal existing thereon is transferred to the signal output terminal of the electronic switch; and an electronic reshaping circuit having an input terminal and an output terminal, the input terminal connected to the output terminal of the electronic switch for receiving and reshaping a signal output from the electronic switch, wherein the output terminal of the electronic reshaping circuit is connected to an input terminal of a client layer.

* * * * *